(12) United States Patent
Tailliet

(10) Patent No.: US 9,753,886 B2
(45) Date of Patent: Sep. 5, 2017

(54) COMMUNICATION ON AN I2C BUS

(71) Applicant: STMicroelectronics (Rousset) SAS, Rousset (FR)

(72) Inventor: Francois Tailliet, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 349 days.

(21) Appl. No.: 14/452,620

(22) Filed: Aug. 6, 2014

(65) Prior Publication Data
US 2015/0046627 A1 Feb. 12, 2015

(30) Foreign Application Priority Data

Aug. 8, 2013 (FR) ...................................... 13 57876

(51) Int. Cl.
*G06F 13/00* (2006.01)
*G06F 13/42* (2006.01)
*G06F 13/40* (2006.01)

(52) U.S. Cl.
CPC ...... *G06F 13/4282* (2013.01); *G06F 13/4068* (2013.01); *G06F 13/4291* (2013.01); *G06F 2213/0016* (2013.01)

(58) Field of Classification Search
CPC .......... G06F 13/24; G06F 3/0661; G06F 3/20; G06F 13/20
USPC ........ 710/110, 106, 314, 105, 260, 300–306, 710/311
See application file for complete search history.

(56) References Cited

U.S. PATENT DOCUMENTS

| 5,897,663 | A | * | 4/1999 | Stancil | .................. | G06F 13/385 711/154 |
| 6,070,214 | A | * | 5/2000 | Ahern | ................. | G06F 13/4045 710/106 |
| 8,078,770 | B1 | | 12/2011 | Sivertsen | | |
| 2005/0165989 | A1 | * | 7/2005 | Kim | ........................ | G06F 13/24 710/260 |
| 2009/0140781 | A1 | * | 6/2009 | Chae | .................... | G06F 13/4291 327/144 |

FOREIGN PATENT DOCUMENTS

| CN | 102455972 A | 5/2012 |
| WO | WO-2005045688 A1 | 5/2005 |

OTHER PUBLICATIONS

INPI Search Report and Written Opinion for FR 1357876 dated Mar. 24, 2014 (6 pages).

* cited by examiner

*Primary Examiner* — Tim T Vo
*Assistant Examiner* — Kim T. Huynh
(74) *Attorney, Agent, or Firm* — Gardere Wynne Sewell LLP

(57) ABSTRACT

A communication system includes an I2C bus interconnecting at least one first device and one second device. At least one direct data link, other than the I2C bus, interconnects the first and second devices. The system is configurable to operate in: a first operating mode providing for data only transmission between the first and second devices over the I2C bus; and a second operating mode providing for simultaneous data transmission between the first and second devices over both the I2C bus and said data link.

12 Claims, 3 Drawing Sheets

COMMUNICATION ON AN I2C BUS

PRIORITY CLAIM

This application claims the priority benefit of French Patent application number 1357876, filed on Aug. 8, 2013, which is hereby incorporated by reference to the maximum extent allowable by law.

BACKGROUND

Technical Field

The present disclosure generally relates to electronic circuits and, more specifically, to circuits comprising one or a plurality of EEPROMs connected to an I2C bus.

Discussion of the Related Art

An I2C bus is a standardized twin-wire bus (UM10204—I2C-Bus specification and user manual REV.4—13 Feb. 2012, both incorporated by reference). EEPROMs are devices capable, among other things, of being connected to an I2C bus to store data coming from other devices connected to the bus or to provide data to these devices.

A device intending to write or read data into an EEPROM presents on the bus a slave device address enabling the EEPROM to be identified, and the address for reading or writing the data from and into the memory. In the case of a write operation, the device presents a series of data on the bus. In the case of a read operation, the series of read data is presented on the bus by the EEPROM.

The I2C bus is a serial bus comprising two conductors respectively intended to convey data and a synchronization signal. The bus flow rate is determined by the frequency of the synchronization signals which, in practice, is limited by the structure of the devices connected to the bus or for power consumption reasons.

SUMMARY

An embodiment aims at overcoming all or part of the disadvantages of systems comprising an EEPROM on an I2C bus.

Another embodiment aims at increasing the communication speed between an EEPROM and a device connected to an I2C bus.

Another embodiment aims at a configurable solution compatible with an existing operation on an I2C bus.

More generally, an embodiment aims at enabling a slave device connected to an I2C bus to operate with an increased communication speed on request of a master device.

Thus, an embodiment provides a communication system comprising: an I2C bus; at least one first device connected to the bus; at least one second device connected to the bus; and at least one direct data link, other than the bus, between the two devices.

According to an embodiment, a first operating mode where data only transit between the two devices over the I2C bus and a second operating mode where the data transit over the I2C bus and over said direct link are provided.

According to an embodiment, the second operating mode is activated by the first device by switching the states of the direct link(s).

An embodiment also provides a device adapted to the above system, comprising: a first input-output terminal intended for an I2C synchronization signal; a second input-output terminal intended for an I2C data signal; and at least one third data input-output terminal.

According to an embodiment, the third terminal(s) are each directly connected to one of said links between devices.

According to an embodiment, the device further comprises an internal management circuit processing the respective states present on the third terminal(s).

According to an embodiment, the device further comprises an EEPROM.

A method of communication between a first device and a second device of such a system, wherein the states of the signals present on said direct link(s) correspond, during a first byte of an I2C frame, to the states of the three bits of rank 1 to 3 of a device selection byte of an I2C frame, is also provided.

According to an embodiment, a switching from the first mode to the second mode is caused by a state switching of the signal present on the involved direct link during an acknowledgement bit which follows said first byte.

According to an embodiment, said state switching is individualized for each direct link to select the number of direct links used in the second mode.

BRIEF DESCRIPTION OF THE DRAWINGS

The foregoing and other features and advantages will be discussed in detail in the following non-limiting description of specific embodiments in connection with the accompanying drawings wherein.

DETAILED DESCRIPTION

Figure 1:
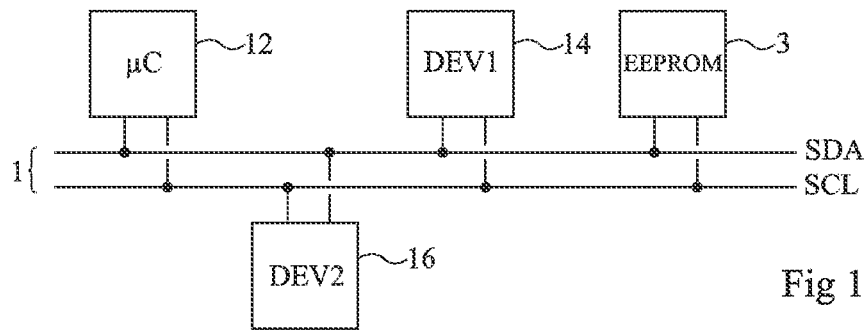
FIG. 1 is a simplified representation of a system comprising electronic devices connected to an I2C bus.

The same elements have been designated with the same reference numerals in the various drawings, where the timing diagrams have been drawn out of scale. For clarity, only those steps and elements which are useful to the understanding of the embodiments which will be described have been shown and will be detailed. In particular, the operation of an I2C bus has only partially been detailed, the described embodiments being, for the rest, compatible with the usual operation of an I2C bus. Further, the nature of the data exchanged between a device and an EEPROM has not been detailed either, the described embodiments being here again compatible with current uses of I2C bus communication.

FIG. 1 is a simplified representation of a system comprising a plurality of electronic devices or circuits connected to a bus 1, of I2C type. The system may be a phone (cell phone, DECT, or other), radio or television broadcasting equipment, a computer, and more generally any piece of equipment processing digital data.

An I2C bus comprises two conductors SDA and SCL, respectively intended to convey data and a synchronization signal. The I2C protocol is standardized.

A plurality of electronic circuits intended to communicate together are connected to bus 1. Most often, these devices comprise a microcontroller 12 and various circuits or devices 14 (DEV1), 16 (DEV2), for example, volatile or non-volatile memories, decoders, processors, sensors, etc. In the examples targeted by the present disclosure, one or a plurality of reprogrammable non-volatile memory (EEPROM) circuits 3 are connected to bus 1.

In the representation of FIG. 1, only the conductors of bus 1 have been shown. In practice, the system generally comprises other components and circuits 12, 14, 16, and 3 may be connected to various power supply conductors and to other address, data, and control buses, which have not been shown.

Figure 2:
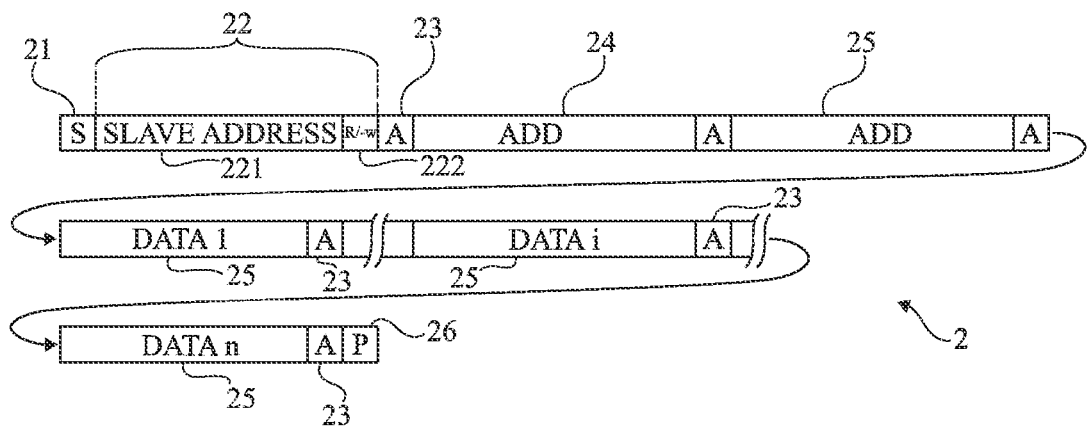
FIG. 2 very schematically illustrates a communication frame on an I2C bus.

FIG. 2 shows an example of a frame 2 of communication from a master device or circuit to a slave circuit.

Although reference will be made hereafter to a microcontroller 12 (μC) as the master circuit and to an EEPROM 3 as the slave circuit, what will be described more generally applies to any circuit capable of communicating over an I2C bus.

According to the I2C standard, a frame starts with a start condition 21 (S) followed by a selection byte 22 having a first portion 221 (SLAVE ADDRESS) over 7 bits identifying the addressee memory and a second portion 222 (R/-W) over 1 bit identifying by its state 1 or 0 (logic level) the operation to be performed (reading R or writing W). Each byte transmitted over the I2C bus is followed by a bit 23 (A) set by the receiver and having a state indicating to the microcontroller (or to the transmit device) whether the byte has or not been received by the receiver. Actually, bit 23 is idle in a state (N), corresponding to logic state 1, indicative of a lack of reception and, when it has received the byte, the receiver device switches this bit to a state (A), corresponding to logic state 0, which is decoded as an acknowledgement by the transmitter. In the case of a writing, once the slave circuit has been selected (addressed), one or two next bytes 24 (ADD) are used to identify the write address in the circuit. In the case of a reading, the two address bytes are absent, the address having been communicated to the memory during the previous frame (interrupted write frame). Then, the data are transmitted in bytes 25 (DATAi, with i ranging between 1 and n). An acknowledgement bit 23, generated by the device receiving the data, follows each transmitted address or data byte. The end of the frame is marked by a stop condition 26 (P) set by the master device. In the case of a writing, data bits 25 are transmitted from the master device to the slave device. In the case of a reading of the data from the memory, bytes 25 are transmitted from the slave device to the master device.

A problem which arises with usual communications over an I2C bus, be it for a memory or any other device, is that the speed is limited in practice. Indeed, it being a serial bus, this speed is conditioned by the clock frequency of communication of the data over the bus. Be it for technical reasons or to avoid excessively increasing the circuit consumption, such a clock frequency generally does not exceed a few hundreds of kHz.

In certain applications, a higher speed would be desirable.

For example, in the case of an EEPROM, it may be desired to program all or part of the content at the end of the manufacturing or before the putting into service, to have a higher speed.

However, it remains desirable, in this case, to be able to switch back the memory to a normal operating mode so that a given memory, programmed at the end of the manufacturing, can be used with no modification to the use of the standardized I2C bus.

According to another example, it may be desired to use a memory integrating, including in its final environment, the two high- and low-speed functions.

To be compatible with an I2C operation, the bytes present in a standardized frame should thus be used.

Further, to be compatible with the I2C protocol, no opcodes or instructions other than bit 222 (R/-W) are available.

Figure 3:
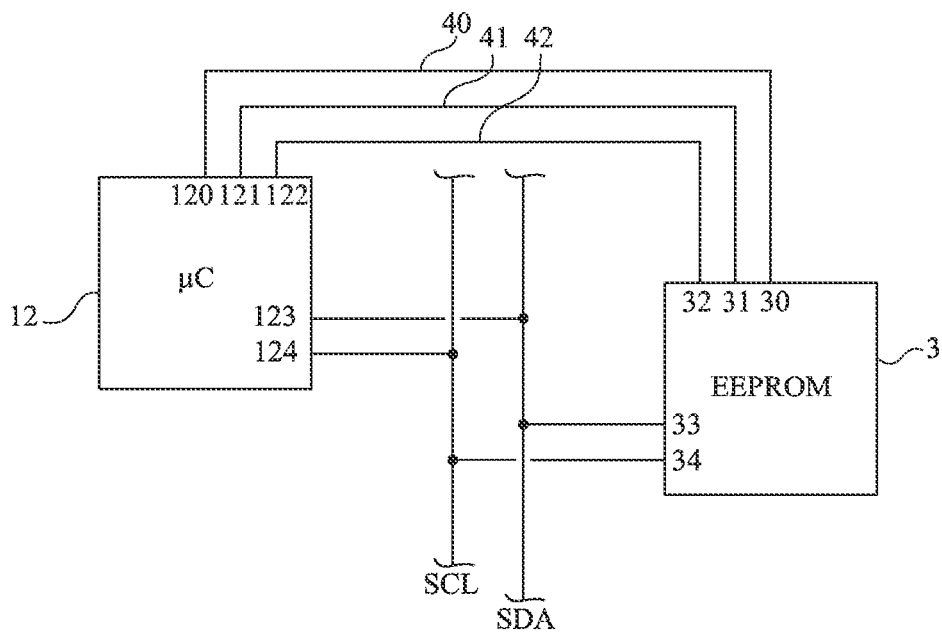
FIG. 3 is a representation in the form of blocks of an embodiment of a system having an increased communication speed between a device and an EEPROM.

FIG. 3 is a simplified partial representation in the form of blocks of an embodiment of a system of communication between a microcontroller 12 and a memory 3 over an I2C bus, having an increased speed capacity. In addition to the I2C bus, from one to three additional conductors 40, 41, and 42 connecting microcontroller 12 (terminals 120, 121, and 122) to memory 3 are provided. Memory circuit 3 thus comprises at least one additional data input-output, internally connected to a control circuit of the memory plane, not shown, for programming and reading purposes. In the example of FIG. 3, three terminals 30, 31, and 32 are provided in addition to the terminals connected to the SDA and SCL conductors.

Additional conductors 40 to 42 are intended to convey data in parallel to the data conveyed by the SDA conductor of the bus, which increases, by a ratio from 2 to 4, the transmission speed.

The use of such additional conductors is transparent in that a memory 3 connected to a usual microcontroller (having no additional ports of connection to conductors 40 to 42) operates normally by exploiting the I2C protocol and in that a usual memory (having no terminals 30 to 32 of connection of additional conductors 40 to 42) connected to a microcontroller 12 having terminals 120 to 122 operates normally according to the I2C protocol.

Thus, memory 3 will have two operating modes, a standard I2C mode and a high-speed mode using one or a plurality of the three additional terminals 30, 31, or 32, which connect it to conductors 40 to 42.

Figure 4:
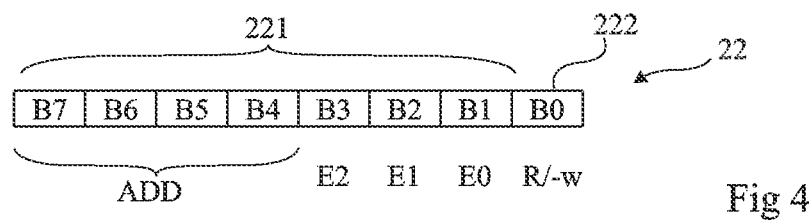
FIG. 4 schematically illustrates the content of an addressing byte of an I2C frame.

FIG. 4 schematically illustrates a byte 22 for selecting a slave circuit and indicating the operation to be performed.

The first four most significant bits (B4, B5, B6, and B7) are intended to contain the address of the slave device and are positioned by the microcontroller to select the memory connected to the bus. The next three bits B1, B2, and B3 have a use which depends on the capacity in terms of number of memory addresses and contain, according to the size of the memory, either a portion of the data address therein, or the bits of selection of a memory circuit from among a plurality thereof. Least significant bit 222 (B0) identifies the nature (reading or writing) of the operation to be performed.

Actually, byte 24 (FIG. 2) or the two bytes 24 of the I2C frame condition the addressing capacity of the memory (1 byte limits it to 16 kbits, 2 bytes limit it to 512 kbits). It is however possible to extend this addressing capacity up to 4 megabits by using from 1 to 3 bits of slave device selection byte 22 (the three bits B1, B2, B3 of address field 221).

EEPROMs operating with an I2C bus can thus be divided into two large categories. Memories having a capacity which requires using, in addition to the one or two address byte(s) 24 of the I2C frame, one or a plurality of bits of selection byte 22, and memories for which the one or two address byte(s) 24 of the I2C frame are sufficient. In practice, the first category concerns memories of more than 2 kbits (4 kbits and more) if a single address byte 24 is used (so-called I2C addressing mode) and memories of more than 512 kbits (1 megabits and more) if two address bytes 24 are used (so-called extended I2C addressing mode).

Bits B1, B2, B3 which are not used as an address complement in the memory circuit may be used as bits of selection of a memory circuit from among a plurality thereof having the same most significant address bits (bits B7, B6, B5, and B4). In this case, bits B1 to B3 used as circuit selection bits are set to a state interpretable by the memory circuit at the beginning of a frame.

Figure 5:
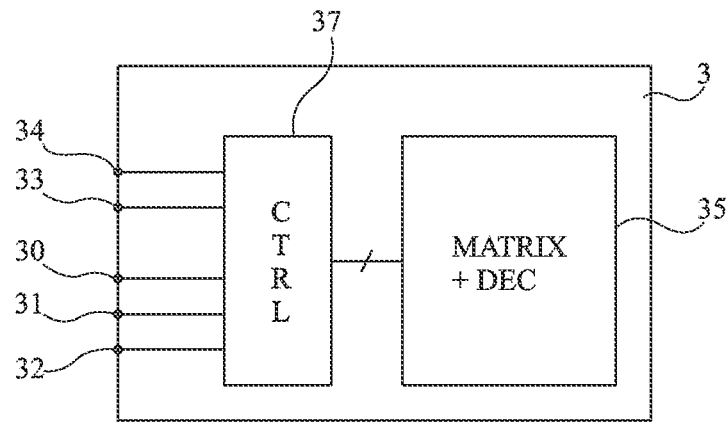
FIG. 5 very schematically shows an embodiment of an EEPROM circuit.

FIG. 5 shows in the form of blocks the simplified diagram of an embodiment of an EEPROM. Memory 3 comprises a matrix network 35 (MATRIX+DEC) of memory cells associated with row and column decoders, and a control circuit 37 (CTRL) delivering the address, data, and control signals as well as the power supply to block 35. Circuit 37 is connected, on the one hand, to two input-output terminals 33 and 34, intended to be connected to the I2C bus and, in this example, to three input-output terminals 30, 31, and 32 for the high-speed mode.

Circuit 37 interprets the states (decodes the signals) present on the different terminals 30 to 34 to determine the operating mode and to read or write data from or into network 35.

Microcontroller 12 (FIG. 3) sets states E0, E1, and E2 of terminals 120, 121, and 122.

Figure 6:
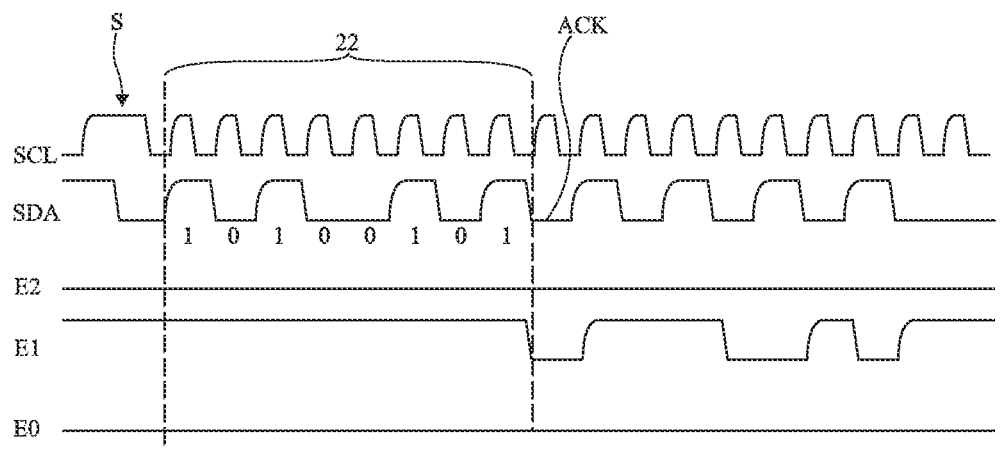
FIG. 6 illustrates in the form of timing diagrams an embodiment of a method of communication between a master circuit and a slave circuit.

FIG. 6 illustrates, in the form of timing diagrams, a first example of the implementation of a high-speed mode using the I2C protocol. The timing diagrams respectively show examples of shapes of signal SCL, of signal SDA, and of respective states E2, E1, and E0.

States E0, E1, and E2 are used, once the memory has been selected by a start-of-frame, to tell it which terminal(s) 30 to 32 should be used in addition to terminal 34 for the addresses and the data.

In the example of FIG. 6, it is assumed that the microcontroller intends to double the memory reading speed, that is, to use one of conductors 40 to 42, in addition to the SDA conductor.

A start-of-frame S and the sending of a read control signal to a memory having address 1010 (bits B7 to B4) and selection bits B3, B2, B1, at states 010, is assumed. The last bit of byte 22, at state 1, indicates a read request. During byte 22, the microcontroller sets signals E0, E1, and E2 to the states of bits B1, B2, and B3.

During the acknowledgement bit (ACK) positioned by the slave device, the microcontroller switches the state of signal E0, E1, or E2 (here E1) on the conductor that it intends to use for the high speed. This tells the memory that it should also use its terminal 31 (in addition to the SDA conductor). Once this configuration has been achieved, the memory and the microcontroller use the defined conductor(s) 40 to 42 to exchange addresses and data. There thus are two serial links, each respecting the protocol of an I2C frame.

In the example of FIG. 6, the sending of a byte 10101010 on the SDA conductor and of a byte 11100101 on conductor 41 is assumed. In the case of a reading, the address having been communicated to the memory during the previous frame, the bytes directly are data bytes. The signals on the SDA conductor and on conductor 41 are interpreted in accordance with the I2C protocol. Thus, it is as if the communication bus had one synchronization signal and two data signals.

Figure 7:
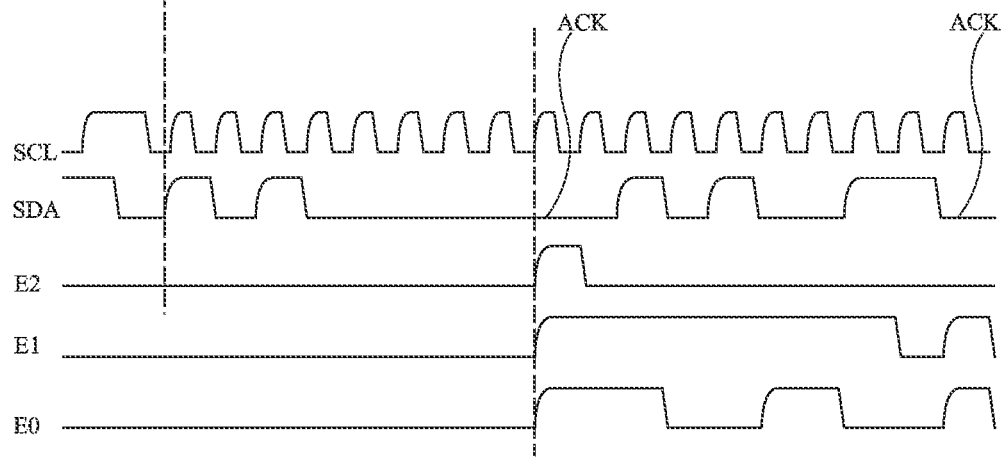
FIG. 7 illustrates in the form of timing diagrams another embodiment of the method of communication between a master circuit and a slave circuit.

FIG. 7 illustrates another example where all three conductors 40 to 42 are used to increase the speed. A write order with the sending, by the master device, of slave address 1010000 (bits B7 to B1), is assumed. As in the embodiment of FIG. 6, the microcontroller sets states E0 to E2 so that they are, during byte 22, identical to bits B1 to B3. During acknowledgement bit ACK set by the memory, the microcontroller switches respective states E0, E1, and E2 (in these examples, switches them to state 1). This tells the memory that the microcontroller will send addresses and data over all three conductors 40 to 42 in addition to the SDA bit.

In the shown example, during the next eight clock periods (signal SCL), the master device sends, over the SDA conductor, byte 01010011, over conductor E2, byte 00000000, over conductor E1, byte 11111110, and over conductor E0, byte 11001100. Then, the microcontroller sends a high state (1) over the different wires during acknowledgement bit 25 (ACK).

The described management of conductors 40 to 42 enables to respect the I2C protocol while increasing the speed. In particular, it is possible for the master device to select, for each frame, the number of additional conductors used, which for example enables to respect the desired remaining memory addressing granularity per byte. It is actually sufficient for the microcontroller to select that or those of signals E0 and E2 having their state switched by it during the acknowledgement bit following the first byte of the frame.

It should be noted that, even if bits B1 to B3 are used as most significant memory data address bits, it remains possible to use signals E0 to E2 for an increased speed. Indeed, since the mode is selected by inverting the state of the signal on the acknowledgement bit, the memory has already received bits B1 to B3 contained in the frame. Further, the microcontroller preferably forces states E0 to E2 to the levels of bits B1 to B3 during the first byte of the I2C frame, which enables the signals to be stable before the possible switching to the high speed mode.

The configuration of a memory may take different forms according to what use is made of terminals 30 to 32.

Figure 8:
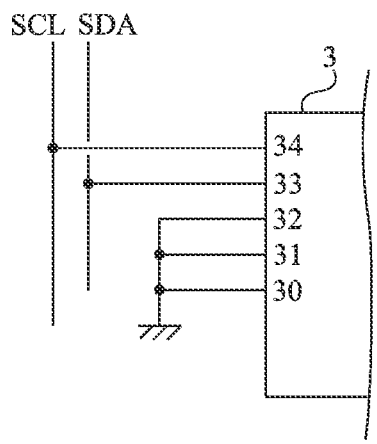
FIG. 8 very schematically illustrates an example of connection of a memory.

FIG. 8 shows an example according to which, in the final environment of memory 3, terminals 30 to 32 are grounded. As a variation, they are connected to the positive power supply voltage (state 1). This illustrates a case where the high-speed mode is used, during the memory manufacturing, to initially store data or in test mode. Then, in operation, the memory is used in standard fashion. Indeed, control circuit 37 of the memory will never detect a state switching of signals E0 to E2 during an acknowledgement which follows the first byte of a frame.

Figure 9:
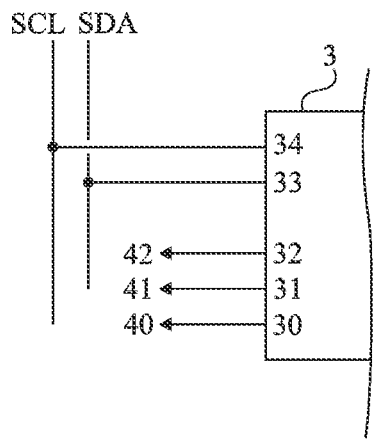
FIG. 9 very schematically illustrates another example of connection of a memory.

FIG. 9 shows another example according to which, in the final environment of memory 3, terminals 30 to 32 are connected to conductors 40 to 42, and thus to the microcontroller. This enables to select the communication mode (low or high speed) by order of the microcontroller by switching signals E0 to E2 according to the number of bytes to be processed in parallel, the selection being performed for each communication frame.

An advantage of the embodiments which have been described is that they enable to increase the communication speed between a memory and a microcontroller at the I2C standard.

Another advantage is that the described solutions are compatibles with a standard use of the I2C protocol.

Another advantage is the selection of the operating mode of the memory by its connection in its final environment. Memories such as described hereabove can thus be manufactured in large series and the choice between a standard memory and a memory of increased speed can be postponed to the assembly of these memories.

Various embodiments have been described, various alterations and modifications will occur to those skilled in the art. In particular, although the preferred embodiment uses at most three direct links to process states E0 to E2 corresponding to the levels of bits B1 to B3, additional links may be provided. However, the compatibility with the I2C protocol is then limited. Further, the practical implementation of the described embodiments and the circuit structure on the memory side to interpret the respective states of the signals present on terminals 30 to 32 is within the abilities of those skilled in the art based on the functional indications given here above.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A communication system, comprising:
    an I2C bus comprising a data conductor and a synchronization conductor;
    at least one first device directly electrically connected to both the data conductor and the synchronization conductor of the I2C bus;
    at least one second device directly electrically connected to both the data conductor and the synchronization conductor the I2C bus;
    wherein the connections formed between the at least one first device and the at least one second device by the data conductor and the synchronization conductor are physically and electrically uninterrupted; and
    at least one direct data link, other than the data conductor and synchronization conductor of the I2C bus, between the two devices, the at least one direct data link comprising a physically and electrically uninterrupted conductor;
    wherein the at least one first device and the at least one second device are configured to communicate data simultaneously over both the I2C bus and the at least one direct data link.

2. The system of claim 1, having a first operating mode configured for data only transit between the two devices over the I2C bus and a second operating mode configured for simultaneous data transit over both the I2C bus and said direct link.

3. The system of claim 1, wherein the second operating mode is activated by the first device by switching the states of the direct link(s).

4. The system of claim 1, wherein said first and second device comprise:
    a first input-output terminal intended for an I2C synchronization signal;
    a second input-output terminal intended for an I2C data signal;
    wherein the first and second input-output terminals are configured for connection to the synchronization conductor and data conductor of the I2C bus; and
    at least one third data input-output terminal configured for connection to said direct link.

5. The system of claim 4, wherein the third data input-output terminal(s) are each directly connected to one of said direct links between devices.

6. The system of claim 4, further comprising an internal management circuit processing the respective states present on the third terminal(s).

7. The device of claim 4, wherein one of said first and second devices comprises an EEPROM.

8. A method of communication between a first device and a second device interconnected by an I2C bus and a direct data link, other than the I2C bus, comprising:
    setting logic states of signals present on said direct data link to correspond, during a first byte of an I2C frame, to the states of the three bits of rank 1 to 3 of a device selection byte of an I2C frame;
    communicating data simultaneously over both the I2C bus and the direct data link.

9. The method of claim 8, further comprising switching from a first operating mode configured for data only transit between the two devices over the I2C bus and a second operating mode configured for simultaneous data transit over both the I2C bus and said direct link by a state switching of the signal present on the involved direct link during an acknowledgement bit which follows said first byte.

10. The method of claim 9, wherein said state switching is individualized for each direct link to select the number of direct links used in the second mode.

11. A system, comprising:
    a first device having an I2C port and another communications port;
    a second device having an I2C port and another communications port;
    a I2C bus coupling the I2C ports of the first and second devices, the I2C bus comprising a data conductor and a synchronization conductor;
    wherein the data conductor and synchronization conductor directly electrically connect the first device and second device in a physically and electrically uninterrupted manner;
    a direct data link coupling the another communications ports of the first and second devices, the direct data link comprising a physically and electrically uninterrupted conductor;
    wherein the system is configurable to operate in:
        a first operating mode providing for data only transmission between the first and second devices over the I2C bus; and
        a second operating mode providing for simultaneous data transmission between the first and second devices over both the I2C bus and said direct data link.

12. The system of claim 11, wherein one of the first and second devices functions as a master device, and wherein said master device is configured to transmit a slave selection signal on the I2C bus, subsequently receive an acknowledgment on the I2C bus and during the acknowledgment assert a signal on said data link indicating operation in the second operating mode.

* * * * *